United States Patent [19]

Viletto

[11] Patent Number: 5,606,519
[45] Date of Patent: Feb. 25, 1997

[54] PORTABLE ELECTRONIC COMPUTER WITH REMOVABLE DISK DRIVE

[75] Inventor: Giacomo Viletto, Maglione, Italy

[73] Assignee: Ing. C. Olivetti & C., S.p.A., Ivrea, Italy

[21] Appl. No.: 214,741

[22] Filed: Mar. 18, 1994

[30] Foreign Application Priority Data

Mar. 29, 1993 [IT] Italy .................. TO93A0211

[51] Int. Cl.$^6$ ................................ G06F 1/26
[52] U.S. Cl. ........................ 364/708.1; 361/685
[58] Field of Search .................. 364/708.1; 361/685

[56] References Cited

U.S. PATENT DOCUMENTS

| | | | |
|---|---|---|---|
| 4,894,792 | 1/1990 | Mitchell et al. | 364/708.1 |
| 4,991,058 | 2/1991 | Watkins et al. | 361/391 |
| 5,132,876 | 7/1992 | Ma | 361/685 |
| 5,260,851 | 11/1993 | Chiou | 361/685 |
| 5,260,884 | 11/1993 | Stern | 364/708.1 |
| 5,305,180 | 4/1994 | Mitchell et al. | 361/685 |
| 5,321,580 | 6/1994 | Hosoi et al. | 361/685 |
| 5,325,263 | 6/1994 | Singer et al. | 361/685 |

FOREIGN PATENT DOCUMENTS

| | | |
|---|---|---|
| 0364119A3 | 4/1990 | European Pat. Off. . |
| 0463585A3 | 1/1992 | European Pat. Off. . |
| 2584211 | 6/1985 | France . |
| WO90/00304 | 1/1990 | WIPO . |
| WO90/16094 | 12/1990 | WIPO . |
| WO91/17493 | 11/1991 | WIPO . |

OTHER PUBLICATIONS

IBM Technical Disclosure Bulletin, vol. 29, No. 8, Jan. 1987, New York, U.S. pp. 3491–3492, "Access Method For Feature Expansion".

*Primary Examiner*—David H. Malzahn
*Attorney, Agent, or Firm*—Banner & Allegretti, Ltd.

[57] ABSTRACT

A computer comprises a keyboard, and a base with a housing accommodating either a floppy disk drive or part of an external power supply which can be connected to the mains. When the power supply is fitted in the housing, a sensor prepares a reduced output power state. The keyboard is mobile, and there is a hard disk drive which can be removed by raising the keyboard from its operating position.

16 Claims, 5 Drawing Sheets

PORTABLE ELECTRONIC COMPUTER WITH REMOVABLE DISK DRIVE

FIELD OF THE INVENTION

This invention relates to a portable electronic computer comprising a base with an electronic unit for controlling and managing the computer's functions, a housing for accommodating a disk drive for reading and writing disk memory, and which can be supplied by an external power supply.

BACKGROUND OF THE INVENTION

From European Patent Application No. EP-A-0 426 414, a portable computer of this type is known in which another unit, for example a modem, can be inserted instead of the disk drive. This computer can be supplied from the mains through an external power supply which requires appropriate means of transport. It is therefore not easy to handle and it is cumbersome during transport, or of limited range, in which case the operator renounces the external power supply.

From patent U.S. Pat. No. 4,926,365, a portable computer is known in which the disk drive housing is located at the top of the base, behind the area occupied by the keyboard. This is possible because it is of the "Laptop" type (390×300 mm), but cannot be adopted when the computer is of the "Notebook" or "Ultra portable" type.

SUMMARY OF THE INVENTION

A preferred embodiment of the present invention provides a portable computer of very small dimensions which can be supplied from the mains, and/or which can accommodate a removable disk drive.

The invention is defined in the appended claims to which reference should now be made.

BRIEF DESCRIPTION OF THE DRAWING

A preferred embodiment of the invention will now be described in detail, by way of example, with reference to the attached drawings in which.

DETAILED DESCRIPTION OF A PREFERRED EMBODIMENT

With reference to FIGS. 1–12, the portable computer, indicated generally as 21, comprises a babe 22 on which a cover 27 with a monitor 26 is hinged. An electronic unit 23 is housed in the base 22 and this manages the computer's functions. A keyboard 28 on the top of the base 22 controls the electronic unit 23, by means of the keys 29.

The base 22, the shape of which is virtually parallelepiped, has a top 55, a bottom 31, a front wall 32, a rear wall 33, a right side 34 and a left side 36. A display 37 on the base 22 displays symbols indicating the computer's operating states.

Figure 5:
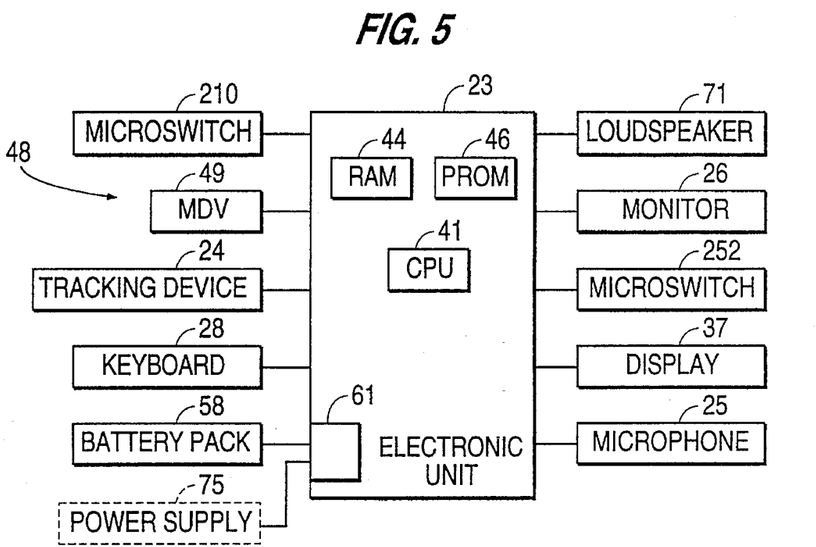
FIG. 5 is a block diagram of the computer of FIG. 1.

The electronic unit 23 comprises a central unit (CPU) 41 and a set of components, comprising RAM memories 44 and a PROM memory 46. The RAMs 44 contain instructions and data in a volatile state, and the memory 46 contains the operating system's programs in a permanent state.

There is also a hard disk drive (HDU) 49 for exchanging data with the electronic unit 23. The drive 49 can be housed in a housing 51 located at the top of the base 22. The computer can also comprise a disk drive 52 for reading and writing on a removable disk, for example a magnetic floppy type.

A structure of this type is described in the U.S. patent application Ser. No. 08/162,289 filed on Dec. 7, 1993 in the Applicant's name. The dimensions of the base 22 are preferably, but are not limited to, 217×280×43 mm, which in plan view correspond to A4 size for computers known as "Notebook" computers. The computer 21 can store in memory and reproduce text and speech and, for this purpose, has a loudspeaker 71 on the level 55 of the base 22 and a microphone 25 (FIG. 5) on the cover 27, connected to the electronic unit 23.

The keyboard 28 is housed in a thin parallelepiped container 57, hinged on the median of the base 22 by means of a flexible hinge 60. The keyboard can assume a working position, which may be observed in FIG. 1, in which it is superimposed on the top level 55, or an access position, which may be observed in FIG. 11, in which it permits access to a surface 56 which is lower than the level 55.

A rechargeable battery pack 58 is housed in a housing 59 in the level 56 for supplying the unit 23 through a control circuit 61. When the keyboard 28 is in the access position, it permits access to the disk drive 49 and the battery pack 58.

The base 22 (FIGS. 1–11) comprises a parallelepiped housing 76 on the right side 34, below the low level 56, for housing a removable tracking device 24.

The computer 21 can be supplied by an external power supply 75, both for operation and for recharging the batteries inserted in the seating 59, through the circuit 61.

In this embodiment of the invention, the base 22 has a housing 201 for accommodating either the disk drive 52 or an insertable part 202 of the external power supply 75. The housing 201 is basically parallelepiped in shape and is located in the bottom 31 of the base 22, at the rear, so as to occupy, in section, about one quarter of the surface of the bottom 31. The part 202 is parallelepiped in shape and is adjacent to a part 203, basically trapezoidal in section, which projects from the housing 201 when the power supply is inserted in the housing 201, in order to allow the computer to assume an angled position in relation to a plane of support, as may be observed in FIG. 1. The power supply 75 also includes an extension 204 which can be extracted from the projecting part 203, and together with the bottom 31, in an area adjacent to the housing 201, improves the support stability of the computer. A sensor 205 projecting from the part 202 operates with the bottom of the housing 201 and a microswitch 210.

The sensor 205 consists of a lug on the insertable part 202, which is connected to a lever 233 which rotates on a hinge 234 of the power supply 75, and which works together with the microswitch 210.

The disk drive 52 is basically parallelepiped in shape and it comprises a front wall 226 with holes 217, which supports a series of disk contacts 227.

The housing 201 is delimited by the rear wall 33, an inner wall 206 parallel to the wall 33 and an inner wall 207, and is open on the right side 34. The walls 33 and 206 both have a slot-shaped opening 208 open at the top which matches a pin 209 projecting from lateral walls of the disk drive 52, or a pin 236 projecting from the side walls of the power supply 75.

The inner wall 207 comprises a compartment 213 for accommodating a mobile support 214 with two projecting guide pins 216, which fit into the holes 217 of the disk drive 52 to guide the disk drive 52 during assembly. The support 214 houses a rubber component 219 with projecting lugs 221, which match a set of contacts 222 attached to the support 214 and connected to the electronic unit 23. A leaf spring 223 normally holds the mobile support 214 against the wall 207.

To fit the disk drive 52 in the computer 21, the disk drive 52 is positioned at an angle in the housing 201 and the front wall 226 is inserted towards the inner wall 207, engaging the guide pins 216 in the holes 217 while continuing to push; the disk drive 52 makes the mobile support 214 slide backwards against the action of the leaf spring 223. When the pins 209 are level with their respective slots 208, the disk drive 52 can be lowered and released. Because of the action of the leaf spring 223, the pins 209 slide in the slots 208 and lock the disk drive 52.

The disk drive 52 also includes a flexible plate 228, which acts against an edge 229 of the bottom 31 when the disk drive 52 is correctly inserted in the housing 201. Any accidental impacts or blows are controlled by the plate 228 and prevent the drive 52 becoming disengaged from the housing 201. The action of the component 219 ensures a perfect electrical contact between the contacts 222 and contacts 227.

To dismantle the disk drive 52, the flexible plate 228 is lowered and released from the edge 229, the drive 52 is pushed inwards against the action of the leaf spring 223 until the pins 209 line up with the openings of the respective slots 208, and the drive 52 is lifted and released from its slot.

Figures 1, 11, 12:
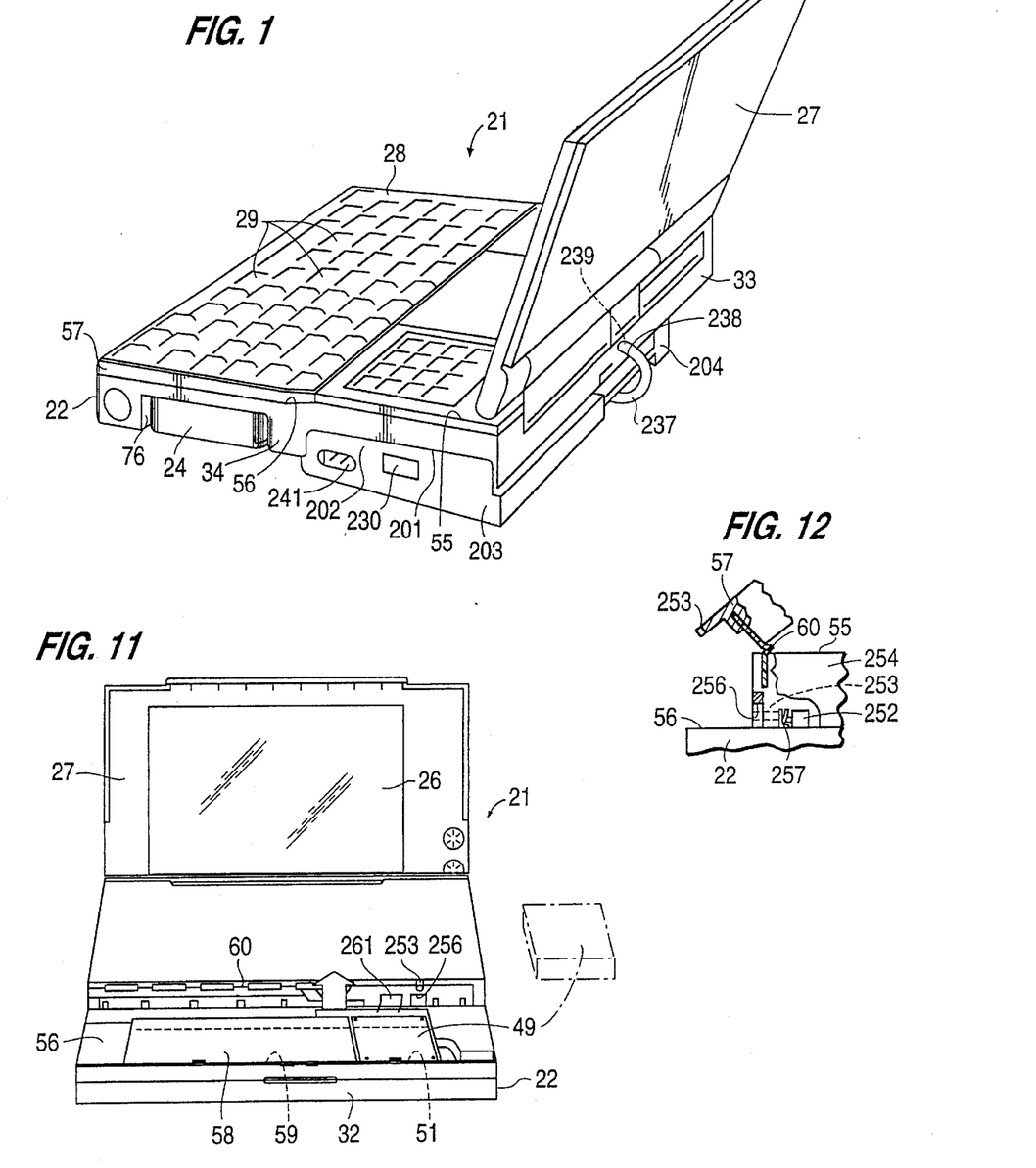
FIG. 1 shows a perspective view of the rear right of a portable computer embodying the invention.
FIG. 11 represents a partial front view of the computer of FIG. 1 in a certain stage of operation.
FIG. 12 shows a cutaway view of details of FIG. 11.

Alternatively the external power supply 75, which may be observed in FIG. 1, may be partially inserted in the housing 201. In the insertable part 202, the power supply 75 comprises a projecting guide 231, which has two holes 232 for accommodating the guide pins 216 of the mobile support 214. The power supply 75 also has a hook 225 controlled by a key 230 which engages in a slot 235 on the bottom of the housing 201, when it is in the locked position, to prevent accidental unlocking.

The power supply 75 is fitted in the housing 201 in the same way as the disk drive 52. The power supply 75 is positioned in the housing 201, it is pushed until the pins 216 of the mobile support 214 engage in the holes 232 and the pins 236 are aligned with the slot 208; the power supply is then lowered, allowing the leaf spring 223 to move it backwards, locking the pins 236 against the bottom of the slot 208.

Figure 3:
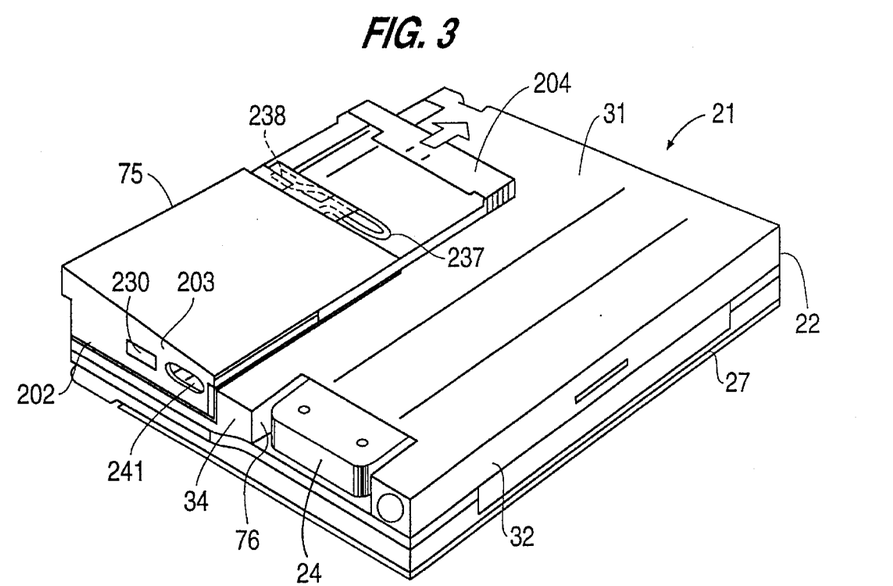
FIG. 3 is a perspective view of the base of the computer of FIG. 1.
Figures 4, 4A:
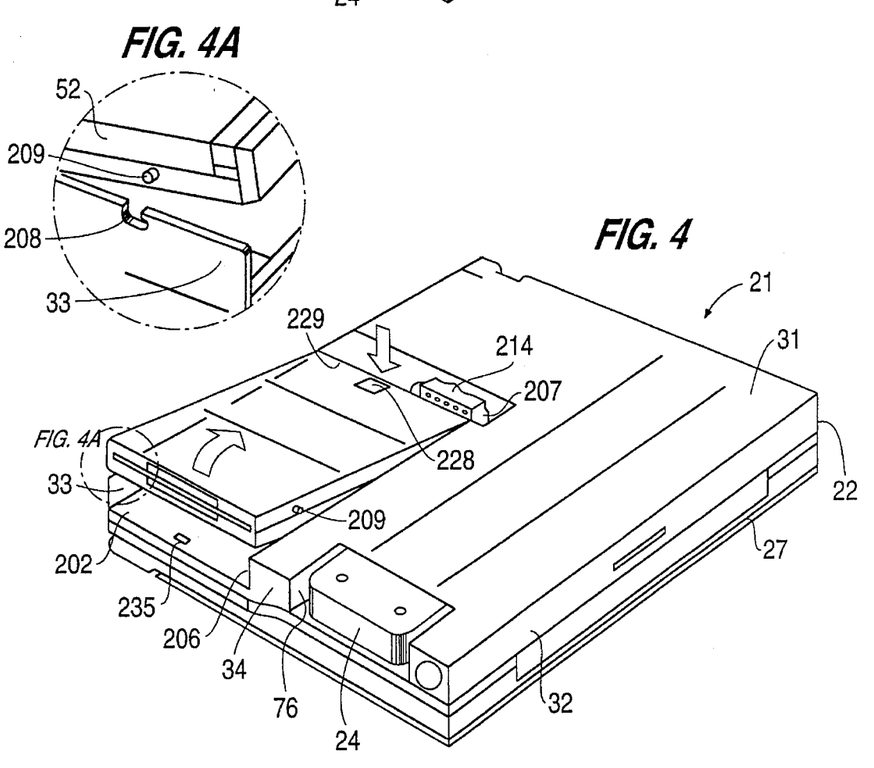
FIG. 4 shows a perspective view of the base of the computer of FIG. 2, in a particular stage of operation.
FIG. 4A shows in an enlarged scale a detail of FIG. 4.

In the locked position, the sensor 205 is pushed inwards, and it inclines the lever 233, activating the microswitch 210. The extension 204 is then pulled out so that together with the bottom 31 of the computer 21, it improves the support stability of the computer 21 on the work surface, as shown in FIG. 3. For the electrical connections to the computer and the network, the power supply 75 has a cable 237 on the side of the extractable extension 204, which ends with a plug 238 and, on the opposite side, a plug 241. The plug 238 can be inserted in a socket 239 of the base 22 and the plug 241 can be connected to a socket 242 of a cable 243, on the other end of which there is a plug 244 for the mains supply.

The disk drive 49 preferably uses a 2.5" magnetic disk and is housed in a parallelepiped container. It can be connected electrically and in a removable manner with the electronic unit 23, by means of connectors of a known type which are not shown on the drawings. The housing 51 is also parallelepiped and is adjacent to the housing 59.

The computer 21 comprises a microswitch 252 which functions together with an extension 253 of the container 57 in order to detect the working position of the keyboard 28. The flexible hinge 60 is mounted between an edge of the container 57 and a step 254 of the base 22. The step 254 has a hole 256, and a flexible plate 257 aligned with the hole 256 can function together with the microswitch 252. When the keyboard is in the working position, the extension 253 penetrates into the hole 256 and by means of the plate 257 enables the microswitch 252. The movement of the keyboard 28 towards the removal position makes the extension 253 come out of the hole 256 and disables the microswitch 252.

The basic program of the electronic unit 23 renders the disk drive 49 operative only when the microswitch 252 is enabled. The movement of the keyboard to the removal position disables the microswitch 252 and activates a save routine in which the contents of the RAMs 44 are saved in the disk drive 49 and the drive 49 is then immediately set to a removal configuration for safe removal from the housing 51.

The removal of the drive 49 from the housing 51 is also facilitated by a tab 261 projecting from the top of the container of the drive 49 and moreover causes the disconnection of the connectors of the computer and the drive 49.

The computer 21 may be supplied from the external power supply 75, either for normal operation or to recharge the batteries inserted in the housing 59, through the recharging circuit 61.

Figure 6:
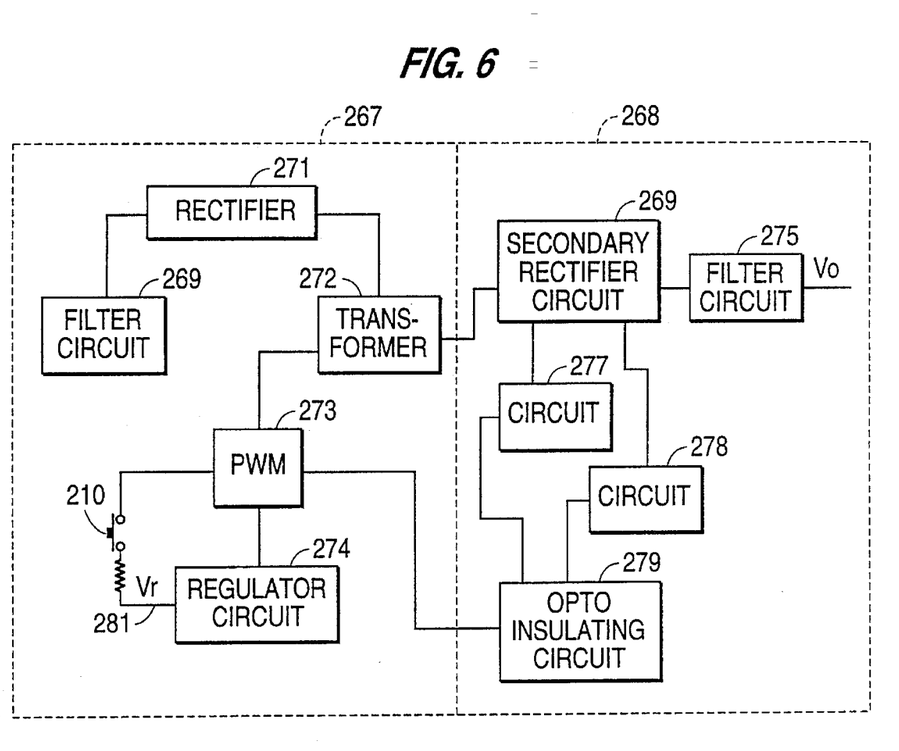
FIG. 6 shows a block diagram of the detail in FIG. 5.
Figure 7:
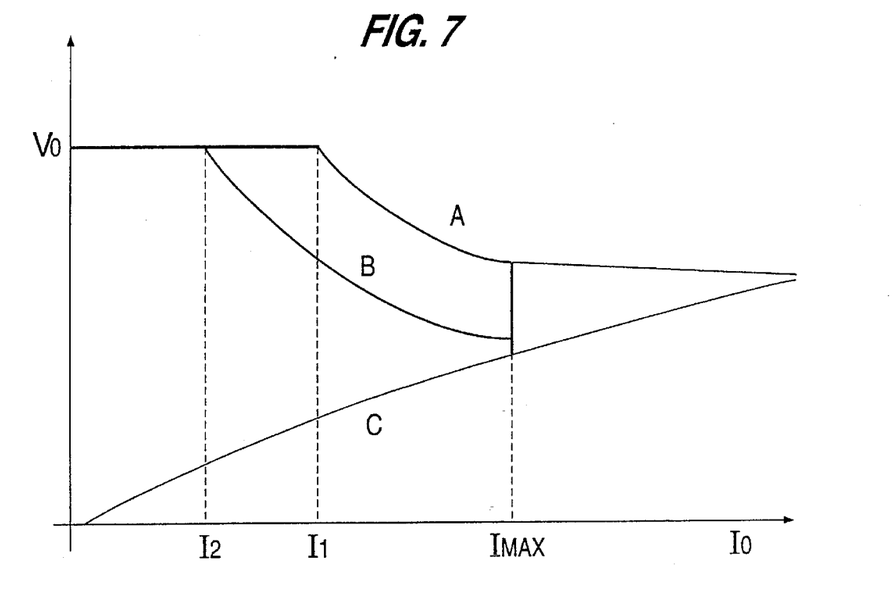
FIG. 7 is a functional diagram of the detail in FIG. 6.
Figure 8:
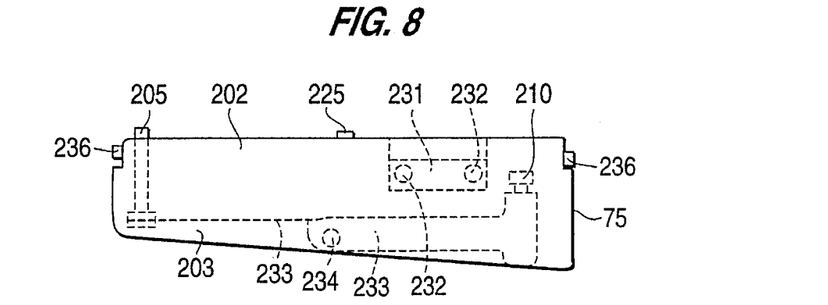
FIG. 8 Shows a partial frontal view of a detail in FIGS. 1 and 2.
Figure 9:
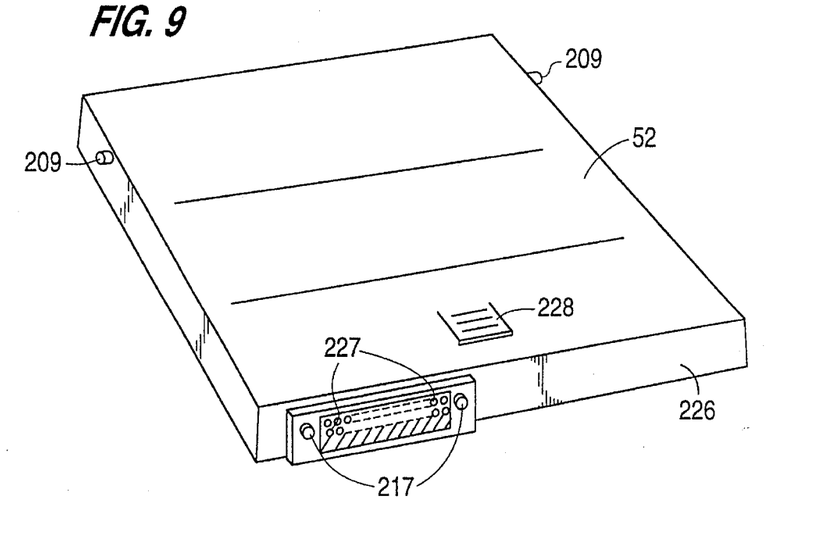
FIG. 9 is a perspective view of another detail of FIG. 2.
Figure 10:
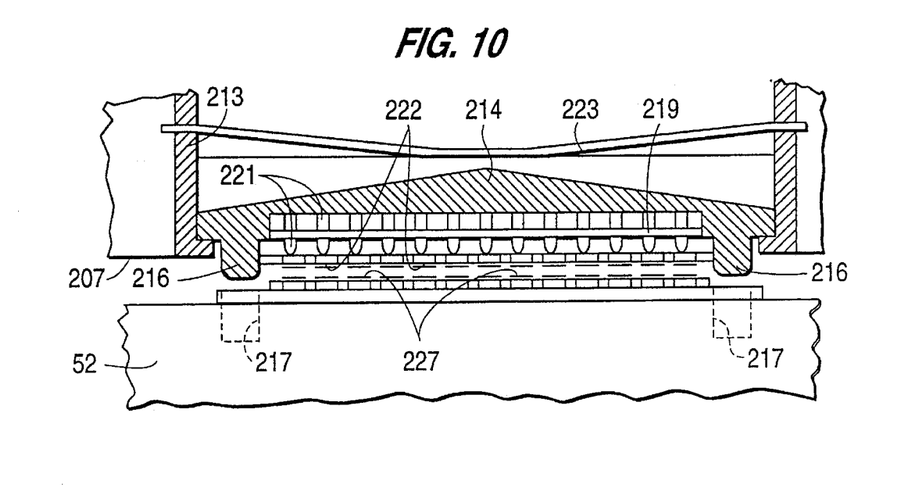
FIG. 10 is a partial plan view of the details in FIG. 4.

With reference to FIG. 6, the power supply 75 comprises a section 267 which can be connected to the mains and a section 268 which can be connected to the electronic unit 23 and electrically insulated. The section 267 has a filter circuit 269, a primary rectifier circuit 271, an insulation transformer 272, a pulse-modulation type (PWM) control circuit 273 and a regulating circuit 274 for the output power. The section 268 has a filter circuit 275 and a secondary rectifier circuit 276 connected to a control circuit 277 for output voltage and a control circuit 278 for output current. An opto-insulating circuit 279 connects circuit 273 to circuits 277 and 278, insulating them electrically.

The regulating circuit 274 can be regulated for two different maximum values for output power, in relation to an internal reference voltage, or in relation to a reduced voltage value Vr at its input 281, connected to the microswitch 210. In the absence of voltage at the input 281, the maximum power that can be delivered Wo Max corresponds to a standard value STD. When the input 281 instead receives the voltage Vr, the maximum power that can be delivered Wo Max is reduced to about 0.4.STD. The dissipated power inside the power supply 75 will be reduced accordingly.

The circuit 277 maintains the output voltage Vo constant, until the output power Wo reaches its maximum value STD or 0.4.STD. Above these values, the voltage Vo gradually falls as the absorption by the various components of the computer 21 increases, starting from current values I1 and I2, in accordance with the curves A (standard power) and B (reduced power) on the graph in FIG. 7. The circuit 278 finally limits the output current to a maximum value Imax and then brings the voltage Vo to zero, in accordance with the curve C, and maintains it at zero, until the power supply is switched off and switched on again, in a manner which is per se known.

Figure 2:
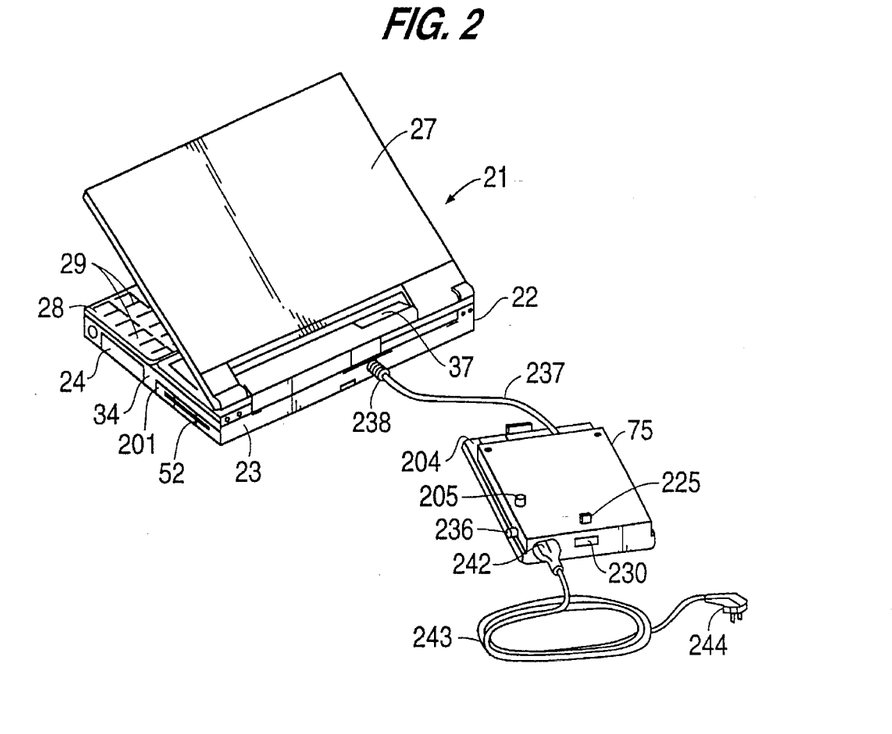
FIG. 2 shows a perspective view of the rear right of another configuration of a computer embodying the invention.

The power supply 75 is rated so that, in a condition of maximum power delivery and when it is removed from the housing 201, as shown in FIG. 2, the dissipated heat is such that very low overheating temperatures are reached in its internal components and on the external surface. These values would be unacceptable if the maximum power were delivered when the power supply was inserted in the housing 201. The terminal of the regulating circuit 281 is appropriately connected to the microswitch 210, to receive the reduced reference voltage Vr, when the power supply 75 is inserted in the housing 201. This makes it possible to limit the excess temperature of the components of the power supply. 75 within normal values.

The actual consequences of a reduced delivery of supply power are negligible in the computer 21. If the batteries 58 are discharged, the supply at reduced power only causes an increase in the battery recharging time.

What I claim is:

1. A portable electronic computer comprising:

a base unit having a bottom surface which is adapted to lie on a support plane and an upper surface opposite to said bottom surface, a housing located on said base unit adjacent to said bottom surface, a keyboard disposed on said upper surface for assuming a first position substantially parallel to said support plane, when said bottom surface lies on said support plane, an electronic unit mounted within said base for managing the computer's functions, a disk drive unit for reading/writing a disk storage, and a power supply unit for supplying said electronic unit, said power supply unit comprising a first portion insertable into said housing and a second portion able to project from said bottom surface, when said first portion is inserted into said housing, to lie on said support plane;

wherein said housing is adapted to removably lodge either said disk drive unit or said first portion of said power supply unit; said keyboard assuming an inclined position with respect to said support plane, when said first portion of said power supply unit is inserted into said housing and said second portion of said power supply unit lies on said support plane;

and wherein said power supply unit further comprises an extension extractable from said second portion for cooperating with said bottom surface in an area adjacent to said housing and so improving the stability of said base unit on said support plane.

2. A portable electronic computer comprising:

a base unit having a bottom surface which is adapted to lie on a support plane and an upper surface opposite to said bottom surface, a housing located on said base unit adjacent to said bottom surface, a keyboard disposed on said upper surface for assuming a first position substantially parallel to said support plane, when said bottom surface lies on said support plane, an electronic unit mounted within said base for managing the computer's functions, a disk drive unit for reading/writing a disk storage, and a power supply unit for supplying said electronic unit, said power supply unit comprising a first portion insertable into said housing and a second portion able to project from said bottom surface, when said first portion is inserted into said housing, to lie on said support plane;

wherein said housing is adapted to removable lodge either said disk drive unit or said first portion of said power supply unit; said keyboard assuming an inclined position with respect to said support plane, when said first portion of said power supply unit is inserted into said housing and said second portion of said power supply unit lies on said support plane;

wherein first attachment means are provided in said housing and second attachment means are provided both in said disk drive and said power supply to co-operate with said first attachment means; and wherein said guide means comprise a pin-slot connection between said housing and said disk drive and alternatively said power supply; and wherein said first and second attachment means comprise hooking means in said disk drive and in said power supply, and contrast means in the housing for cooperating with said hooking means.

3. A portable electronic computer comprising:

a base unit having a bottom surface which is adapted to lie on a support plane and an upper surface opposite to said bottom surface, a housing located on said base unit adjacent to said bottom surface, a keyboard disposed on said upper surface for assuming a first position substantially parallel to said support plane, when said bottom surface lies on said support plane, an electronic unit mounted within said base for managing the computer's functions, a disk drive unit for reading/writing a disk storage, and a power supply unit for supplying said electronic unit, said power supply unit comprising a first portion insertable into said housing and a second portion able to project from said bottom surface, when said first portion is inserted into said housing, to lie on said support plane;

wherein said housing is adapted to removably lodge either said disk drive unit or said first portion of said power supply unit; said keyboard assuming an inclined position with respect to said support plane, when said first portion of said power supply unit is inserted into said housing and said second portion of said power supply unit lies on said support plane; and wherein said power supply is capable of supplying said electronic unit with a standard output power, and wherein switching means are provided for causing said power supply to switch from a first condition in which it supplies said standard output power to a second condition in which it supplies a reduced output power with respect to said standard output supply, sensor means being provided to detect the insertion of said power supply in said housing and causing said switching means to switch said power supply to said second condition.

4. A portable electronic computer comprising:

a base unit having a bottom and an upper side opposite to said bottom;

an electronic unit housed within said base for managing the computer's functions;

a keyboard movably fixed to said upper side;

a housing located on said upper side;

a disk drive unit accommodated within said housing for effecting reading/writing operations on a disk storage;

wherein said keyboard is movable from a working position in which said keyboard lies on said upper side and covers said housing, to a removal position in which said keyboard is removed from said upper side and allows the access to said housing and to said disk drive unit;

said portable computer further comprising detection means located on said upper side adjacent to said keyboard for detecting said working position, and control means responsive to said detection means for conditioning said electronic unit so that said electronic unit allows said disk drive to be operable for reading/writing said disk storage only when said keyboard is in said working position.

5. A portable electronic computer according to claim 4, further comprising a battery housing for receiving rechargeable batteries wherein said housing is adjacent to said battery housing.

6. A portable electronic computer according to claim 4, wherein said detection means comprise a microswitch which is fit to be activated by parts of said keyboard, when said keyboard is in said working position.

7. A portable electronic computer comprising:

a base unit having a bottom surface which is adapted to lie on a support plane, so that said base unit is able to assume a first position substantially parallel with respect to said support plane, a housing located on said base and faced to said bottom surface;

an electronic unit housed within said base for managing the computer's functions;

a disk drive unit for reading/writing a disk storage; and a power supply unit for supplying said electronic unit, said power supply unit comprising a first portion insertable into said housing and a second portion which is able to project from said bottom surface, when said first portion is inserted into said housing, to lie on said support plane;

wherein said housing is adapted to removably lodge either said disk drive unit or said first portion of said power supply unit, said base assuming an inclined position with respect to said support plane, when said first portion of said power supply unit is inserted into said housing and said second portion of said power supply unit lies on said support plane.

8. A portable computer according to claim 7, wherein said second portion of said power supply unit is substantially trapezoidal in section.

9. A portable computer according to claim 7, wherein said disk drive unit and said power supply unit are fit to be removed from said base by pivoting them around a bottom of said housing towards the external of said bottom surface.

10. A portable electronic computer according to claim 7, wherein said power supply unit comprises an extension extractable from said second portion for cooperating with said bottom surface of said base unit in an area adjacent to said housing in order to improve the stability of said base unit on said support plane, when said power supply unit is lodged in said housing.

11. A portable electronic computer according to claim 7, wherein said housing supports a disk connector which is located at said bottom of said housing and which is fit to be coupled with a corresponding connector of said disk drive unit for operatively connecting said disk drive unit and said electronic unit.

12. A portable electronic computer according to claim 7, wherein hooking means including a pin-slot connection are provided between said housing and said disk drive unit and between said housing and said power supply unit.

13. A portable electronic computer according to claim 7, wherein said power supply unit is fit to supply said electronic unit with a standard output power, and wherein switching means are provided for causing said power supply unit to switch from a first condition in which it supplies said standard output power to a second condition in which it supplies a reduced output power with respect to said standard output power, sensor means being provided to detect the insertion of said power supply unit in said housing and causing said switching means to switch said power supply in said second condition.

14. A portable electronic computer according to claim 7, said computer being fit to be supplied by means of rechargeable batteries and including a recharging circuit, wherein said recharging circuit is supplied by said external power supply unit both when this last is inserted in said housing and when it is removed from said housing, and wherein said recharging circuit recharges said rechargeable batteries inserted in said portable computer.

15. A portable electronic computer comprising:

a base unit having a bottom and an upper side opposite to said bottom;

an electronic unit mounted within said base unit for controlling and managing the computer's functions;

a keyboard movably fixed to said upper side;

a housing located on said upper side and open towards the external of said base unit;

a disk drive unit accommodated within said housing and adapted to be conditioned by said electronic unit for effecting reading/writing operations on a disk storage;

wherein said keyboard is movable from a working position in which said keyboard lies on said upper side and covers said housing and said disk drive unit, to a removal position in which said keyboard is removed from said upper side and allows the access to said housing and to said disk drive unit;

said portable computer further comprising detection means for detecting said working position of said keyboard, wherein said detection means are adapted to control said electronic unit so that said disk drive unit is prevented from effecting said reading/writing operations, when said keyboard is in a different position from said working position, wherein said detection means comprise a microswitch which is fixed to said base unit and which is fit to be activated by parts of said keyboard, when said keyboard is in said working position.

16. A portable electronic computer according to claim 15, wherein said detection means controls said electronic unit for stopping said reading/writing operations on said disk storage, when said keyboard leaves said working position, in order to set said disk drive unit in a safe state fit for the removal of said disk drive unit from said housing.

* * * * *